Nov. 28, 1967   A. E. TSCHANZ ET AL   3,354,742
REMOTE CONTROL ASSEMBLY CONSTRUCTION
Filed July 12, 1965

INVENTORS
August E. Tschanz, &
Thomas E. Wilkey
Barnard, McGlynn & Reising
ATTORNEYS

United States Patent Office 3,354,742
Patented Nov. 28, 1967

3,354,742
REMOTE CONTROL ASSEMBLY CONSTRUCTION
August E. Tschanz, Chalfont, and Thomas E. Wilkey, Barto, Pa., assignors to Teleflex Incorporated, North Wales, Pa., a corporation of Delaware
Filed July 12, 1965, Ser. No. 471,304
9 Claims. (Cl. 74—501)

ABSTRACT OF THE DISCLOSURE

A remote control assembly including a flexible conduit having an outer surface of organic polymeric material and an end fitting of organic polymeric material for supporting the conduit with a movable core element movably supported in the conduit and the fitting; a retainer means mechanically interlocking the conduit and the end fitting and including a snap-in portion and a receiving portion with the snap-in portion snapped into and retained in locking engagement with the receiving portion for securing the fitting to the conduit.

---

Remote control assemblies of the type to which the instant invention pertains are typically used in marine, aircraft and automotive installations. Such an assembly includes a guide for supporting a movable core element where the movable core element is used as a control member. For example, remote control assemblies of this type are utilized in automobiles to control such things as vents and heaters. The guide is secured to the support structure of the automobile and the movable core element is moved within the guide to control the heater, vent, or the like. One guide typically used in such installations comprises a flexible conduit with end fittings secured thereto such that a movable core element may be movably disposed within the end fittings and the conduit. An end fitting must engage and be secured to the conduit so as to prevent relative axial movement between the conduit and the end fitting to prevent the conduit from being pulled from the end fitting which is attached to a support structure.

Conduits of the type which are frequently utilized in such remote control assemblies typically comprise an inner tubular member made of organic polymeric material with a plurality of filaments disposed on a long lead about the inner tubular member and a casing of organic polymeric material surrounding the filaments. Preferably, the fittings, which are secured to such conduits, are made of an organic polymeric material, i.e., a plastic material. Fittings made of certain organic polymeric or plastic materials may be molded about the conduit so that the fitting is intimately bonded with outer casing of the conduit, the fitting being thus secured to the conduit to prevent relative axial movement between the conduit and the fitting. The bonding of such plastic fittings to the outer casing of the conduit in remote control assemblies has not proven entirely satisfactory in all situations because particular materials of which the fittings are made are not always compatible for bonding to the material comprising the exterior casing of the conduit to form a chemical bond between the fitting and the exterior casing of the conduit. The bonding of such fittings to the exterior casing of a conduit is not suitable in all cases since in many applications it is desirable to make the exterior of the conduit of a low-priced, low-strength material, such as polyethylene or polypropylene; yet most materials which are compatible for chemical bonding to such a casing do not have the strength characteristics required of an end fitting in particular environments. End fittings must be made of a material having sufficient compression strength so that a bolt, screw, or the like, may be placed through a hole in the fitting and tightened to secure the fitting to a support structure without deforming the plastic material of which the fitting is made. Polymeric organic materials of the type suitable for molding about a conduit so as to be bonded intimately with the exterior casing thereof frequently do not have the compression strength requirements necessary in such fittings. On the other hand, higher priced and higher strength materials, such as an acetal resin, Delrin, or nylon, possess sufficient strength characteristics for use in such end fittings but are not compatible for bonding to the lower priced materials comprising the exterior casing of the conduits, such as polyethylene or polypropylene.

Various attempts have been made to solve the problem of uniting a conduit and an end fitting when the conduit is made of an organic polymeric material which is incompatible for bonding to the organic polymeric material of which the end fitting is made. The most satisfactory solution to date has been to dispose a retaining means about the conduit, such as a molded plastic tab of material suitable for bonding to the outer jacket of the conduit, and mold the end fitting, which is made of an organic polymeric material incompatible for bonding to the exterior casing of the conduit, about the retaining means so that when the end fitting hardens it is mechanically interlocked with the retaining means to prevent relative axial movement between the end fitting and the conduit. Although this method has proven satisfactory, it involves the insertion of the end of a particular length of conduit with a retaining means thereon into a mold such that the end fitting may be molded about the retaining means. Thus, this method necessitates a time consuming and expensive step in making such remote control assemblies. And more importantly, an end fitting is formed about the retaining means on the conduit so that it is impossible to change the type of conduit utilized with a particular fitting after the fitting has been made. Furthermore, if a fitting is molded about each end of the conduit, the length of the conduit, hence the length of the remote control assembly is fixed and cannot be changed.

It is, therefore, an object and feature of this invention to provide a means which may be disposed on the end of a conduit such that the end of the conduit may be inserted into a plastic end fitting so that the conduit and the plastic end fitting are secured together to form a guide for a remote control assembly.

Another object and feature of this invention is to provide a guide comprising a conduit connected to an end fitting wherein the exterior casing of the conduit is made of material incompatible for bonding to the material of which the end fitting is made, yet the end fitting may be molded separately and thereafter secured by a retainer means to the conduit so as to prevent relative axial movement between the end fitting and the conduit.

In general, these and other objects of this invention may be attained by a guide for a remote control assembly including a conduit and a fitting adapted for attachment to a support structure with a retainer means disposed on the end of the conduit. The retainer means is inserted into the end fitting such that a portion of the retainer means forms a mechanical interlock with the fitting so that the fitting is secured to the conduit. Thus, an end fitting of organic polymeric material may be molded separately and later secured to any one of a variety of conduits of various lengths by utilizing such a retainer means.

Other objects and attendant advantages of the present invention will be readily appreciated as the same becomes better understood by reference to the following detailed description when considered in connection with the accompanying drawings wherein.

Figure 1:
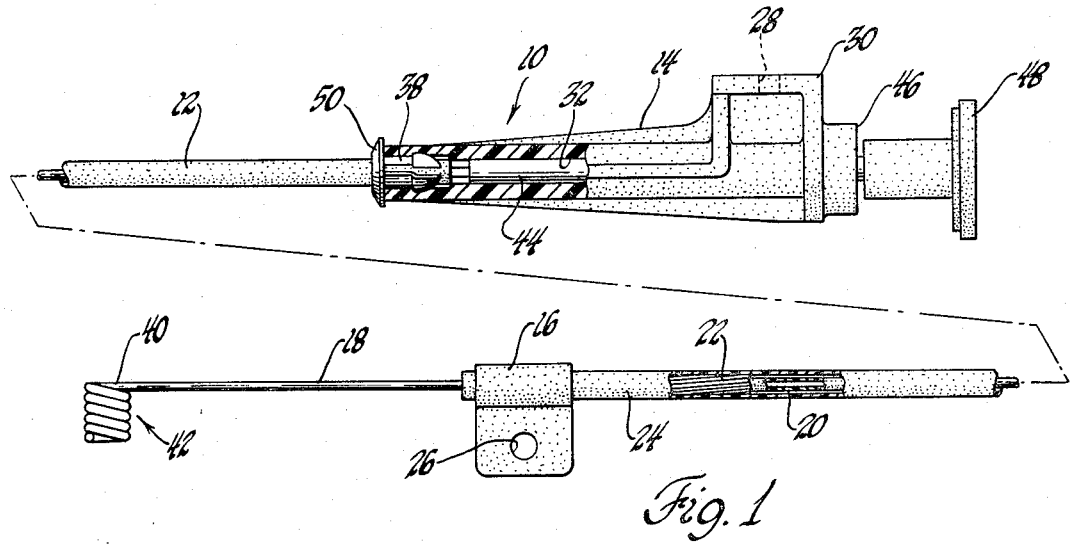
FIGURE 1 is a side elevational view partially in cross section of a preferred embodiment of the remote control assembly of the instant invention.

Referring now to the drawings, wherein like reference numerals indicate like or corresponding parts throughout the several views, there is shown generally at 10 a remote control assembly constructed in accordance with the instant invention. The remote control assembly 10 includes a guide comprising the flexible conduit 12, the end fitting 14, and the support fitting 16. The guide of the remote control assembly 10 supports a movable core element 18.

The flexible conduit 12 includes an inner tube 20 of organic polymeric material preferably of the type having inherent lubricity. The inner tube 20 is surrounded with a plurality of filaments 22 helically wrapped about the inner tube 20 with a relatively long lead. The filaments 22 may be made of any appropriate material, such as wire, fiberglass, or an organic polymeric material. An exterior casing 24 is disposed about the filaments 22 and is preferably made of an organic polymeric material, such as polyethylene or polypropylene.

Support fitting 16 is disposed on one end of the conduit and is adapted by way of the hole 26 to be attached to a support structure. The support fitting 16 is also an end fitting for supporting the conduit 12 in the same manner as fitting 14 and may be secured to the conduit 12 in the same manner as fitting 14 which will become clear hereinafter. The fitting 16 is therefore called a support fitting to distinguish it from fitting 14 for clarity in describing and claiming the invention.

End fitting 14 is made of an organic polymeric material preferably of an acetal resin, Delrin, or nylon, or any other appropriate plastic material having a compression strength sufficient for a screw or bolt to be inserted through a hole 28 to attach the fitting 14 to a support structure without deforming the fitting. The end fitting 14 has a flange 30 with at least one hole 28 therethrough so that the fitting 14 is adapted to be attached to a support structure, such as the dashboard or instrument panel of an automobile. The end fitting 14 also has a bore 32 extending therethrough. The bore 32 has an enlarged portion 34 extending from the first end 36 into the fitting 14. A snap-in retainer means 38 is disposed about the end of the conduit 12 and is inserted into the enlarged portion 34 of the bore 32 for forming a mechanical interlock with the fitting 14 when inserted therein to secure the conduit 12 to the end fitting 14.

The core element 18 is movably disposed in the tube 20 and the bore 32 of the end fitting 14. The core element 18 has a first end 40 extending from one end of the conduit 12 and includes a means comprising the eyelet, generally shown at 42, for attachment to an element to be controlled. The core element includes a slider bar 44 which is slidably disposed in the bore 32 of the end fitting 14. The bar 44 extends from the second end 46 of the end fitting 14 and includes a means comprising the knob 48 for moving the core element 18.

The retainer means 38 comprises a substantially tubular member having a radially extending flange 50 disposed thereabout and in abutting relationship with the end 36 of the fitting 14. A plurality of slots 52 extend along the tubular member to allow for expansion and contraction thereof. The slots 52, therefore, divide the tubular member into a plurality of elongated arcuate sections 54 each of which extend from the flange 50 into the enlarged portion 34 of the bore 32. Each of the arcuate sections 54 has a bulbous portion 56 disposed at the extremity thereof. The bulbous portions 56 are bowed generally outwardly for frictional binding engagement with the enlarged portion 34 of the bore 32 to retain the tubular retainer means 38 therein. The tubular retainer means 38 also has a ridge 58 formed on the interior thereof at the intersection of each of the arcuate sections 54 and the bulbous portions 56 for frictional binding engagement with outer casing 24 of the conduit 12 to retain the conduit in the retainer means 38.

Figure 2:
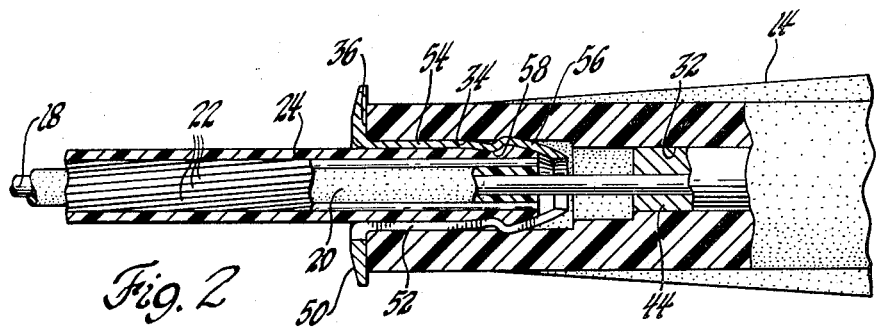
FIGURE 2 is an enlarged fragmentary view partially in cross section of the embodiment shown in FIGURE 1.
Figure 3:
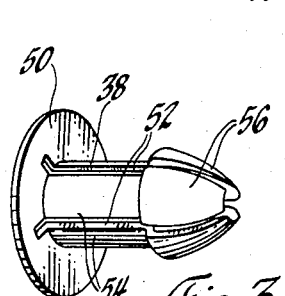
FIGURE 3 is an enlarged perspective view showing the retainer means utilized in the remote control assembly of FIGURES 1 and 2.

As will be evident from FIGURE 2, the tubular retainer means 38 may be disposed on the end of the conduit 12 and inserted into the enlarged portion 34 of the bore 32 of the end fitting 14 so that the bulbous portions 56 are in frictional binding engagement with the enlarged portion 34 of the bore 32 and the ridges 58 are in frictional binding engagement with the conduit 12 so that the conduit 12 is secured to the end fitting 14. The frictional binding engagement occurs because the retainer means 38 is forced into the fitting 14 so that it deforms or binds to the extent that there is sufficient frictional engagement between the retainer means 38 and the conduit 12 and between the retainer means 38 and the fitting 14 to prevent the conduit from being pulled from the fitting 14 unless a very large force is applied to the conduit 12.

Figure 4:
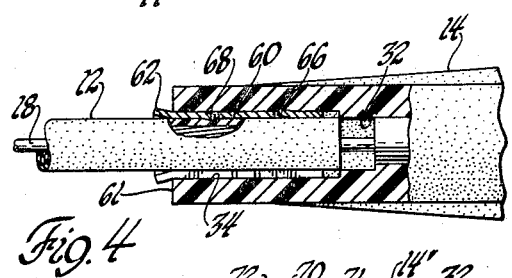
FIGURE 4 is an enlarged fragmentary view partly in cross section showing another preferred embodiment of the instant invention.
Figure 5:
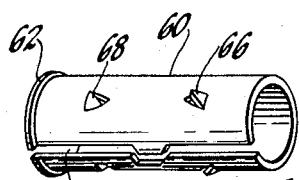
FIGURE 5 is an enlarged perspective view of the retainer means utilized in the embodiment of the invention shown in FIGURE 4.

Referring to FIGURES 4 and 5, there is disclosed an alternative embodiment of the retaining means which comprises a substantially tubular member 60 having a radially extending flange 62 disposed thereabout and in abutting relationship with the end 61 of the fitting 14. The tubular member 60 has a slot 64 extending therealong to allow for expansion and contraction of the tubular member. A plurality of teeth 66 project generally outwardly from the tubular member 60 for digging into the enlarged portion 34 of the bore 32 of the end fitting 14 to secure the tubular member 60 to the end fitting 14. There is also included a plurality of teeth 68 which project generally inwardly from the tubular member 60 for digging into the conduit 12 to secure the conduit 12 in the tubular member 60. As will be apparent from FIGURES 4 and 5, the tubular retaining means 60 may be disposed on the end of the conduit 12 and inserted into the end fitting 14 such that the teeth 66 prevent the tubular retainer means 60 from being pulled from the fitting 14 and the teeth 68 prevent the conduit 14 from being pulled from the retainer 60 such that conduit 12 is secured to the end fitting 14 unless a very large force is applied to the conduit 12.

Although the tubular retainer means 38 and 60 may be made of any appropriate material, they are preferably made of metal.

Figure 6:
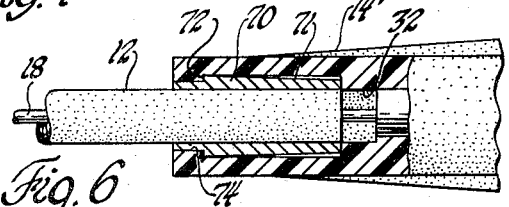
FIGURE 6 is an enlarged fragmentary view partly in cross section showing another preferred embodiment of the instant invention.

Referring to FIGURE 6, there is disclosed an alternative embodiment of the retaining means which comprises the tab 70. The tab 70 is made of an organic polymeric material and is molded about the conduit 12 so as to be bonded thereto. The organic material of which the tab 70 is made is compatible for bonding to the exterior of the conduit 12 so that a diffusion bond is formed between the tab 70 and the exterior of the conduit 12. That is to say, the tab 70 is intimately bonded to the conduit 12 to provide a strong durable attachment. The temperature of the material forming the tab 70 should preferably be somewhat higher than the softening temperature of the exterior of the conduit 12 so that during the molding of the tab 70 to the conduit 12 there is some diffusion of the material of the tab 70 into the material of the conduit 12 and vice versa, thereby providing excellent fusion and hence an optimum bond between the tab 70 and the conduit 12. The tab 70 is molded so that it has a tapered portion 71 and a shoulder 72. The end fitting 14' is molded such that it has a means comprising the inwardly projecting portion 74 for forming a mechanical interlock with the shoulder 72 of the tab 70 and the fitting 14' when the tab 70 is inserted into the fitting 14'. The tapered portion 71 facilitates the insertion of the tab 70 into the fitting 14'. It is to be understood that the tab 70 may be molded into various configurations which mate the fitting 14' so that when the tab 70 is inserted into the fitting 14' there is formed a mechanical interlock to secure the conduit 12 to the fitting 14'.

It will be readily apparent, therefore, to those of ordinary skill in the art that the present invention sets forth a unique and novel remote control assembly and the method for fabricating same whereby a conduit of organic polymeric material may be secured to an end fitting of organic polymeric material incompatible for bonding to the conduit by disposing a retainer means about the conduit and inserting the retainer means about the conduit and inserting the retainer means into the fitting such that the retainer means forms a mechanical interlock with the fitting.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A remote control assembly comprising; a flexible conduit having an outer surface of organic polymeric material, a fitting of organic polymeric material, said fitting including attachment means for attaching the fitting to a support structure, a flexible motion transmitting core element movably supported in said conduit, and means independent of said attachment means mechanically interlocking said conduit and said fitting and including a snap-in portion and a receiving portion, said snap-in portion including means projecting generally outwardly therefrom and in mechanical locking engagement with said receiving portion to prevent relative movement between said snap-in portion and said retaining portion independently of said attachment means.

2. A remote control assembly as set forth in claim 1 wherein one of said snap-in and receiving portions is organic polymeric material molded about said conduit, said receiving portion includes a bore with an outwardly extending shoulder, said means projecting generally outwardly from said snap-in portion includes an outwardly tapered portion and an inwardly extending shoulder, said snap-in portion being disposed in said bore so that said shoulders are in abutting engagement with one another thereby to mechanically secure said conduit to said fitting.

3. A remote control assembly as set forth in claim 1 wherein said fitting has first and second extremities thereof, said bore having an elongated length of reduced cross-section and a smaller length of enlarged cross-section adjacent said first extremity of said fitting and defining said receiving portion, said core element having a slider bar means attached to one end thereof and slidably supported in and guided by said elongated length of said bore, said slider bar means extending from said second extremity of said fitting, said snap-in portion being secured in said smaller length of said bore.

4. A remote control assembly as set forth in claim 3 wherein said snap-in portion comprises a substantially tubular member disposed about said conduit and extending into said smaller length of said bore, said tubular member includes first teeth means projecting generally outward therefrom and digging into said fitting along said smaller length of said bore therethrough, and second teeth means projecting generally inward therefrom and digging into said conduit for securing said conduit to said tubular member.

5. A remote control assembly as set forth in claim 3 wherein said snap-in portion is a member having a first portion thereof in frictional binding engagement with said conduit and a second portion thereof in frictional binding engagement with said fitting thereby to mechanically secure said conduit to said fitting.

6. A remote control assembly as set forth in claim 3 wherein said tubular member includes; a plurality of elongated arcuate sections extending from said flange and into said enlarged portion of said bore, each of said sections having a bulbous portion at the extremity thereof, each of said bulbous portions being bowed generally outwardly for frictional binding engagement with said enlarged portion of said bore to retain said tubular member therein, said tubular member having a ridge formed on the interior thereof at the intersection of each of said sections and said bulbous portions for frictional binding engagement with said conduit to retain said conduit therein.

7. A remote control assembly as set forth in claim 1 wherein said inner conduit includes an inner tube of organic polymeric material, a plurality of filaments helically wound around said tube, a casing of organic polymeric material surrounding said filaments, said end fitting being substantially inflexible, said attachment means comprising a flange adapted for attachment to a support structure.

8. A remote control assembly as set forth in claim 7 wherein said flange has at least one hole therethrough so that a fastener means may be disposed therethrough to attach said end fitting to a support structure.

9. A remote control assembly comprising; a flexible conduit including an inner tube of organic polymeric material, a plurality of filaments helically wound around said tube, a casing of organic polymeric material surrounding said filaments; an end fitting including first and second ends and having a bore therethrough and adapted for attachment to a support structure; and snap-in retainer means disposed about one end of said conduit and disposed in said end fitting and comprising a substantially tubular member having a radially extending flange disposed thereabout and abutting said first end of said end fitting, at least one slot extending along said tubular member to allow for expansion and contraction thereof, said tubular member including a plurality of elongated arcuate sections extending into said enlarged portion of said bore from said flange, each of said sections having a bulbous portion at the extremity thereof, each of said bulbous portions being bowed generally outwardly for frictional binding engagement with said enlarged portion of said bore to retain said tubular member therein, and said tubular member having a ridge formed on the interior thereof at the intersection of each of said sections and said bulbous portions for frictional binding engagement with said conduit to retain said conduit therein.

References Cited
UNITED STATES PATENTS

| | | |
|---|---|---|
| 2,687,831 | 8/1954 | Miller. |
| 2,742,622 | 4/1956 | Stevens. |
| 3,139,768 | 7/1964 | Biesecker. |
| 3,164,400 | 1/1965 | Weaver _____ 74—501 |
| 3,196,706 | 7/1965 | Severence _____ 74—501 |
| 3,263,520 | 8/1966 | Tschanz _____ 74—501 |
| 3,263,948 | 8/1966 | Conrad _____ 74—501 |

MILTON KAUFMAN, *Primary Examiner.*